(12) United States Patent
Chuang et al.

(10) Patent No.: US 7,207,709 B2
(45) Date of Patent: Apr. 24, 2007

(54) DIRECT BACKLIGHT MODULE

(75) Inventors: Yu-Jen Chuang, Kaohsiung (TW); Chien-Hung Kuo, Wur Shiang (TW)

(73) Assignee: AU Optronics Corp., Hsinchu (TW)

( * ) Notice: Subject to any disclaimer, the term of this patent is extended or adjusted under 35 U.S.C. 154(b) by 97 days.

(21) Appl. No.: 10/821,731

(22) Filed: Apr. 9, 2004

(65) Prior Publication Data

US 2005/0002173 A1 Jan. 6, 2005

(30) Foreign Application Priority Data

Jul. 4, 2003 (TW) ............... 92118282 A

(51) Int. Cl.
*F21V 7/04* (2006.01)
(52) U.S. Cl. ............... 362/633; 362/609
(58) Field of Classification Search ........... 362/633
See application file for complete search history.

(56) References Cited

U.S. PATENT DOCUMENTS 4,641,226 A * 2/1987 Kratz .................... 362/218
5,993,027 A * 11/1999 Yamamoto et al. ......... 362/294
6,144,360 A * 11/2000 Evanicky et al. ........... 345/102
6,417,832 B1 * 7/2002 Skinner et al. .............. 362/29
6,789,923 B2 * 9/2004 Liao ........................ 362/294
6,871,979 B2 * 3/2005 Mai ......................... 362/241
6,883,950 B2 * 4/2005 Adachi et al. .............. 362/555

FOREIGN PATENT DOCUMENTS

JP 05-204506 7/1993
JP 11-235797 8/1999

* cited by examiner

Primary Examiner—Ali Alavi
Assistant Examiner—William J. Carter
(74) Attorney, Agent, or Firm—Thomas, Kayden, Horstemeyer & Risley

(57) ABSTRACT

A direct type backlight module. The backlight module includes a first plate, a second plate, a plurality of light sources and a third plate. The second plate connects to the first plate and forming a space between. The plurality of light sources is disposed in the space. The third plate is disposed outside the space, connects to the surface of the first plate and has a plurality of openings.

9 Claims, 2 Drawing Sheets

DIRECT BACKLIGHT MODULE

BACKGROUND OF THE INVENTION

1. Field of the Invention

The present invention relates in general to a direct backlight module and in particular to a direct backlight module with openings which can increase heat dissipation.

2. Description of the Prior Art

FIG. 1 is conventional direct backlight module disclosed in Japanese Publication Nos. 2001-059961 and 07-045114. The conventional backlight module utilizes a base plate 110 and diffusion plate 120 to form a space 130. Several lamps are disposed in the space 130 serving as a light source. To increase the light-utilization efficiency, a reflector plate 150 is disposed on the base plate 110. When the reflector plate is used, the base plate does not require silver plating. When the reflector plate is not used, the base plate must be silver plated. The reflector plate 150 may produce a ripple-shaped (or other shapes) to reflect light and connect to the base plate 110.

The conventional direct backlight module is must be sealed to prevent light leaking. The material of the reflector plate 150 not only reflects light but also reflects heat. Therefore, the heat increases the temperature of the entire backlight module Finally, heat resistance is produced near the base plate 110 adhered to the reflector plate 150, thus reducing heat dissipation in the backlight module. Moreover, the light radiating efficiency of the direct backlight module is reduced.

SUMMARY OF THE INVENTION

An object of the present invention is to provide a direct backlight module that solves the above mentioned problems. The direct backlight module offer improved heat dissipation.

The direct backlight module of the present invention includes a first plate, connected to a second plate with a space formed between, a plurality of light sources disposed in the space, and a third plate with a plurality of openings disposed outside the space connected to the surface of the first plate.

The first plate includes a plurality of protrusions and a plurality of recesses. The protrusions and recesses are alternately arranged, and the light sources are disposed in the recesses.

The plurality of openings correspond to the plurality of protrusions and form a plurality of channels.

The third plate includes a plurality of flexible portions respectively connected to the side of each channel.

The backlight module further includes an enforced heat dissipation device.

The enforced heat dissipation device is a fan.

The height of each protrusion is lower than the center line of the light sources near the protrusion.

The cross-section of the plurality of protrusions and recesses is trapezoidal-shaped.

The cross-section of the plurality of protrusions and recesses is triangular-shaped.

The first plate is a reflector plate.

The second plate is a diffusion plate.

The third plate is a metal plate.

The plurality of light sources are lamps.

The backlight module further includes a first diffuser, a prism and a second diffuser. The first diffuser is disposed on the second plate. The prism is disposed on the first diffuser. The second diffuser is disposed on the prism.

DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

Figure 1:
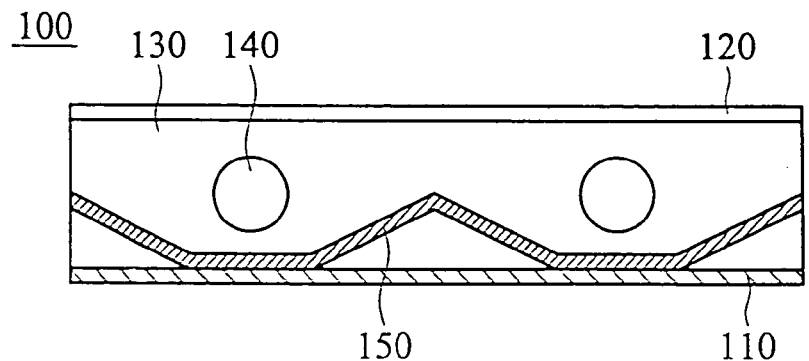
FIG. 1 is a sectional view of a conventional direct backlight module.
Figure 2:
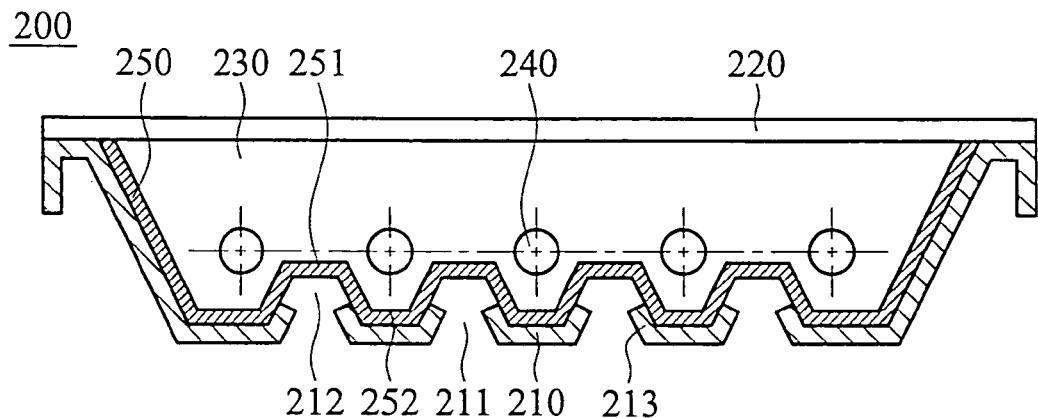
FIG. 2 is a sectional view of a first embodiment in accordance with the present invention.

Referring to FIG. 2, showing a sectional view, a direct backlight module 200 of a first embodiment in accordance with the present invention includes a first plate, a second plate, a base plate 210 and a plurality of light sources. A space 230 exists between the first and second plates. The base plate 210 is disposed outside the space 230 and connected to the surface of the first plate to reinforce the structure of the first plate and from a seal between the second plate and the first plate. The plurality of light sources are disposed in the space 230. In the embodiment, the first plate is a reflector plate 250, the second plate is a diffusion plate 220, and the light sources are lamps 240. To enhance the optical efficiency, several protrusions 251 and recesses 252 are formed on the reflector plate 250. The protrusions 251 and recesses 252 are alternately arranged to form low-step shape. The lamps 240 are arranged in the recesses 252. To prevent the height of the protrusions 251 from reducing optical efficiency, the height of each protrusion 251 is lower than the center line of the lamps 240 near the protrusion 251.

In the base plate 210, a plurality of openings 211 are formed by pressing corresponding to the protrusions 251 to form several channels 212. Residual material remaining thereafter forms a plurality of flexible portions 213 on the sides of the channels 212 to enhance the strength of structure.

Figure 4:
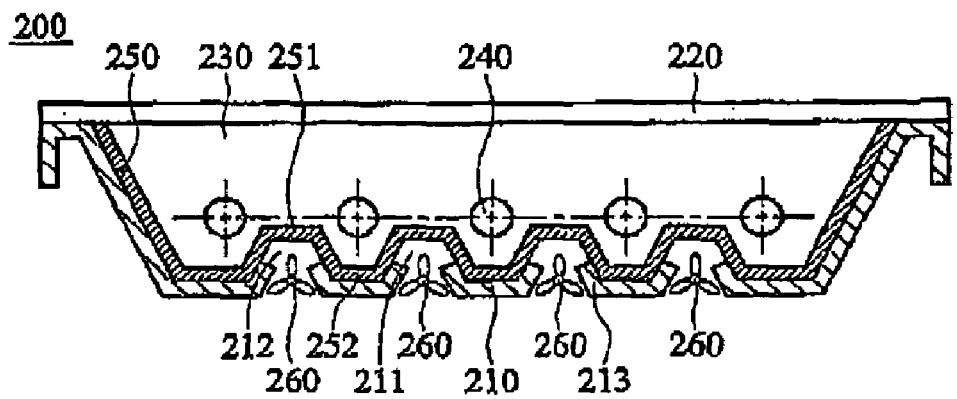
FIG. 4 is a sectional view of a third embodiment in accordance with the present invention.

The base plate 210 is a metal plate. Due to the superior heat conductivity of metal, heat from the direct backlight module 200 is dissipated. The openings 211 of the base plate 210 serve as exits for heat from the direct backlight module 200, while the channels 212 serve as exits for heat generated by radiation. When the channels 212 extend to the edge of the direct backlight module 200, an enforced heat dissipation device, for example a fan 260, is disposed thereat to increase convection and heat dissipation as show in FIG. 4.

Figure 3:
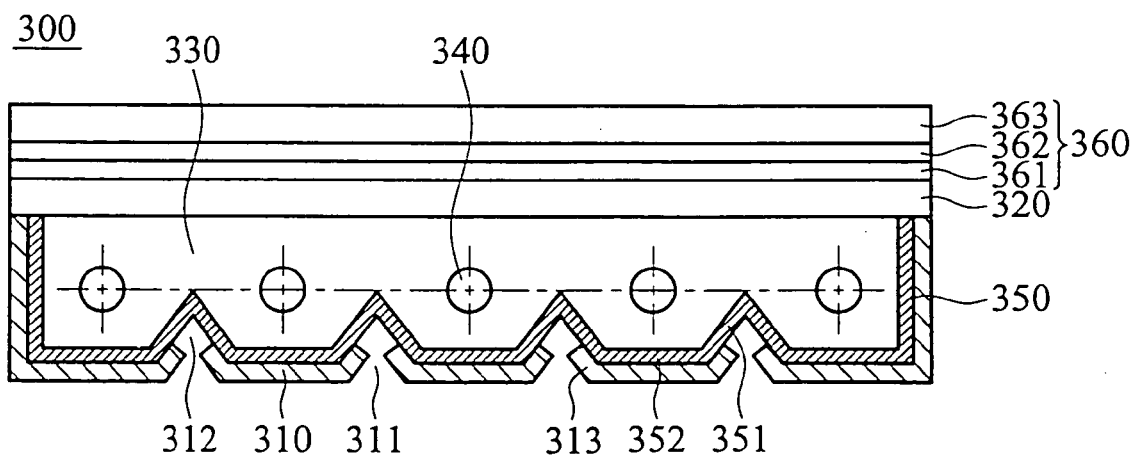
FIG. 3 is a sectional view of a second embodiment in accordance with the present invention.

FIG. 3 shows a sectional view of a direct backlight module 300 of a second embodiment in accordance with the present invention. The direct backlight module 300 includes first plate, a second plate, a base plate 310 and a plurality of light sources. A space 330 exists between the first and second plates. The base plate 310 is disposed outside the space 330 and connected to the surface of the first plate to reinforce the structure of the first plate and create a seal between the first and second plate. The plurality of light sources are disposed in the space 330. In the embodiment, the first plate is a reflector plate 350, the second plate is a diffusion plate 320, and the light sources are lamps 340. To improve optical efficiency, several protrusions 351 and recesses 352 are formed on the reflector plate 350. The protrusions 351 and recesses 352 are alternately arranged to form triangular-shape. The lamps 340 are arranged in the recesses 352. To prevent the height of the protrusions 351 from reducing optical efficiency, the height of each protrusion 351 is lower than the center line of the lamps 340 near the protrusion 351.

In the base plate 310, a plurality of openings 311 are formed by pressing corresponding to the protrusions 351 to form several channels 312. Residual material remaining thereafter forms a plurality of flexible portions 313 on the sides of the channels 312 to enhance the strength of structure.

Figure 5:
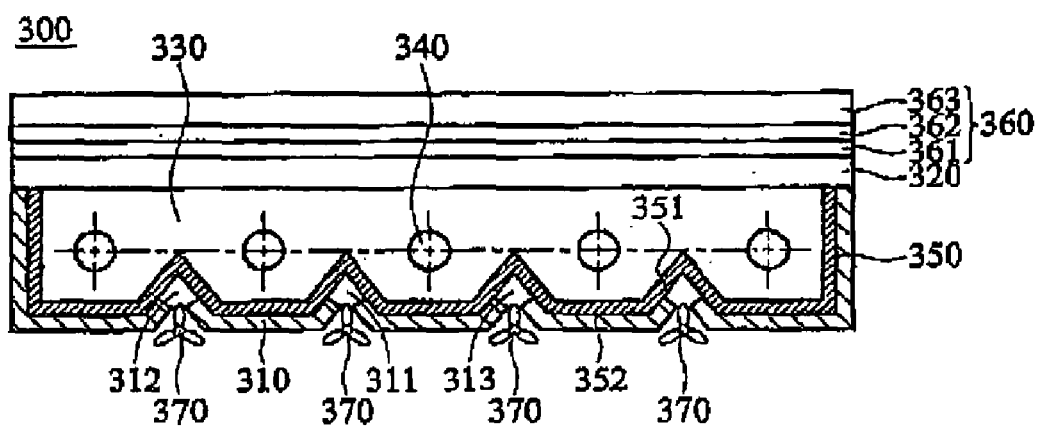
FIG. 5 is a sectional view of a fourth embodiment in accordance with the present invention.

The base plate 310 is a metal plate. Due to the superior heat conductivity of metal, heat from the direct backlight module 300 is dissipated. The openings 311 of the base plate 310 serve as exits for heat from the direct backlight module 300, while the channels 312 serve as exits for heat generated by radiation. When the channels 312 extend to the edge of the direct backlight module 300, an enforced heat dissipation device, for example a fan 370, is disposed thereat to increase convection and heat dissipation as shown in FIG. 5.

Moreover, to provide uniform light diffusion over the entire backlight module, a diffuser assembly 360 is disposed on the diffusion plate 320. The diffuser assembly 360 includes a first diffuser 361, a prism 362 and a second diffuser 363. The first diffuser 361 is disposed on the diffusion plate 320, the prism 362 is disposed on the first diffuser 361 and the second diffuser 363 is disposed on the prism 362. The number and sequence of prisms and diffusers is variable based on requirement.

Finally, while the invention has been described by way of example and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A direct backlight module comprising:
   a first plate having a plurality of protrusions and a plurality of recesses alternately arranged;
   a second plate connected to the first plate forming a space between;
   a plurality of light sources disposed in the recesses; and
   a third plate with a plurality of openings disposed outside the space directly and conformally contacting the first plate along a substantial portion of the third plate and the first plate, wherein the openings are disposed corresponding to the plurality of protrusions and form a plurality of channels.

2. The backlight module as claimed in claim 1, wherein the third plate comprises a plurality of flexible portions respectively connected to the sides of the channels.

3. The backlight module as claimed in claim 1, further comprising an enforced heat dissipation device disposed at the channel.

4. The backlight module as claimed in claim 3, wherein the enforced heat dissipation device is a fan.

5. The backlight module as claimed in claim 1, wherein the cross-section of the plurality of protrusions and recesses is trapezoidal-shaped.

6. The backlight module as claimed in claim 1, wherein the cross-section of the plurality of protrusions and recesses is triangular-shaped.

7. The backlight module as claimed in claim 1, wherein the first plate is a reflector plate.

8. The backlight module as claimed in claim 1, wherein the second plate is a diffusion plate.

9. The backlight module as claimed in claim 1, wherein the plurality of light sources are lamps.

\* \* \* \* \*